UNITED STATES PATENT OFFICE.

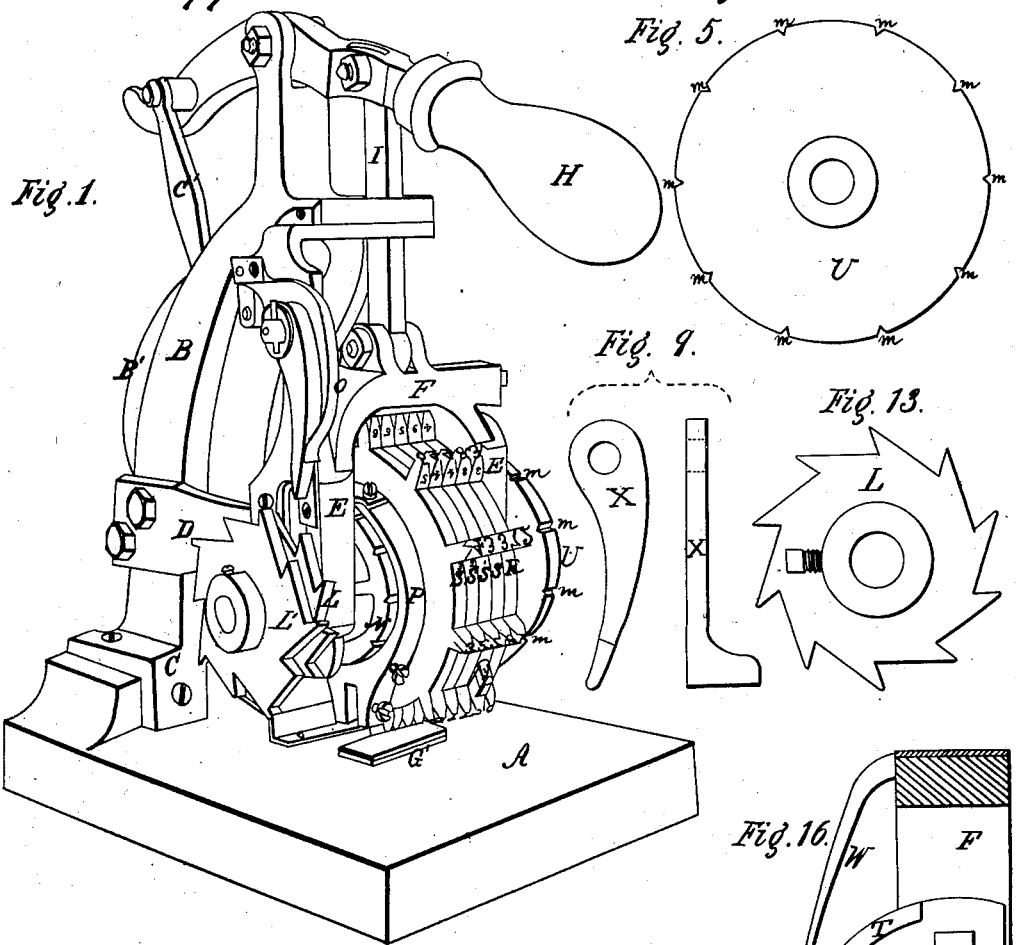

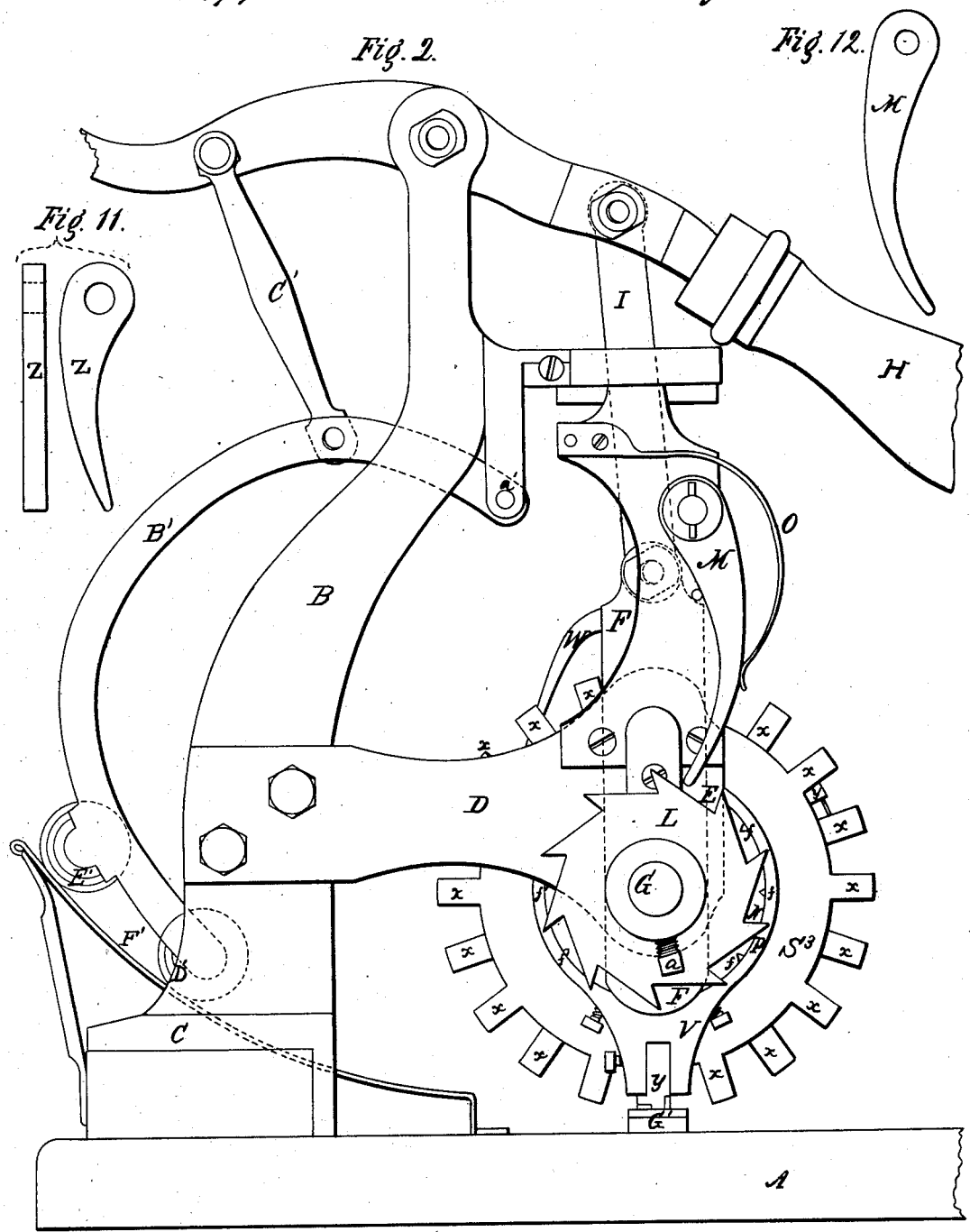

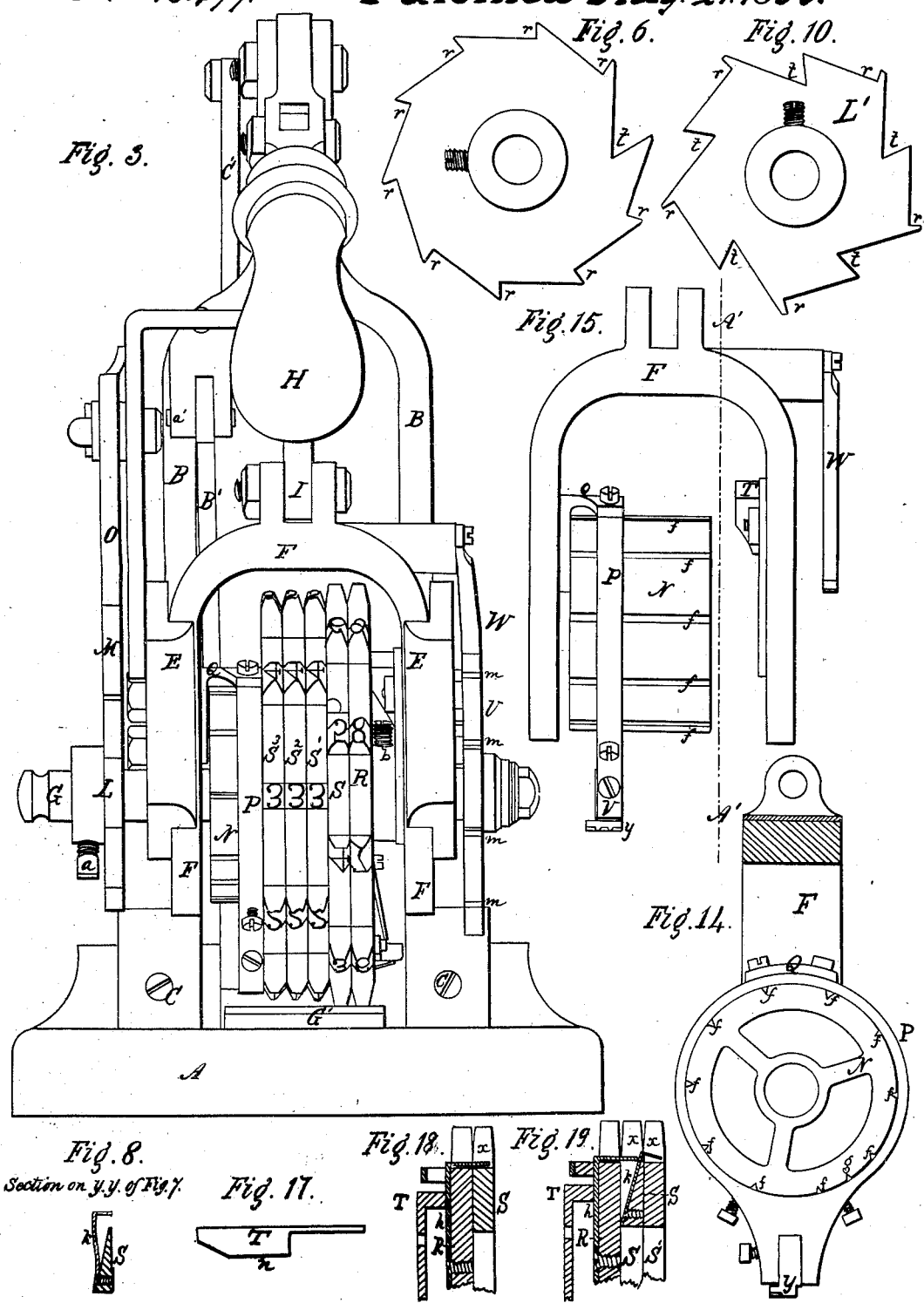

WILLIAM C. DEMAIN, OF BOSTON, MASSACHUSETTS, ASSIGNOR TO A. B. ELY.

MACHINE FOR PAGING BOOKS, &c.

Specification forming part of Letters Patent No. 13,477, dated August 21, 1855.

*To all whom it may concern:*

Be it known that I, WILLIAM C. DEMAIN, of Boston, in the county of Suffolk and State of Massachusetts, have invented a new and Improved Machine for Paging Books, Numbering Bank-Bills, Railroad-Tickets, &c., of which the following is a full, clear, and exact description, reference being had to the accompanying drawings, making part of this specification, in which—

Figure 1 is a perspective view of the machine; Fig. 2, a side elevation; Fig. 3, an end view; Figs. 4, 5, 6, 7, 8, 9, 10, 11, 12, 13, 15, 17, 18, and 19, details which will be referred to hereinafter; Fig. 14, a section on the line A' A' of Fig. 15, the view being taken in the direction of the arrow; Fig. 16, a section upon the same line, the view being taken in the opposite direction.

In my machine the figures are carried by a series of rings or wheels placed side by side upon a drum or cylinder and caused to rotate in the desired order to produce the numbers consecutively.

To enable others skilled in the art to understand my invention, I will proceed to describe the manner in which I have carried it out.

In the accompanying drawings, A is the foundation, to which is secured at C the frame-work B.

D are arms attached to the frame-work and carrying at their extremities the ways E, in which slides up and down the gate F, which carries the operating parts of the machine. This gate is seen in place in Figs. 1, 2, and 3 and detached in Fig. 15, and is operated up and down by the handle H, to which it is connected by the rod I.

G is a shaft which is carried by the gate F and to which is secured the ratchet-wheel L by a screw $a$ passing through its hub.

M is a pawl attached to the frame-work, which engages with the teeth of the ratchet-wheel as the gate is raised and turns the shaft G a portion of a revolution, the pawl M being kept down upon the ratchet-wheel by the spring O.

Upon the shaft G, but not attached thereto, is the drum N, which is held stationary by the carrying-ring P. This ring is secured to the bracket Q, projecting from the gate F, Figs. 3, 14, and 15.

R S S' S$^2$ S$^3$ are the wheels which carry the numbers, and are constructed and operated as follows: Each of these wheels has ten arms $x$, projecting radially from its circumference and upon which are engraved in succession the numbers 1 to 9 and the character 0. The first wheel R is secured to the shaft G by the screw $b$ passing through its hub and revolves with it. The wheels S S' S$^2$ S$^3$ are carried by the drum N, upon which they are caused to revolve in a manner which will be presently explained. Each of these latter wheels carries a spring-bolt $d$ of the form represented in Fig. 7, which enters one or other of the grooves $f g$ in the surface of the drum N. When these bolts are in the groove $g$, the wheels are not in a position to be operated. I have therefore called this groove the "out-of-gear notch," and when the spring-bolts are in any one of the grooves $f$ they are in position to be operated. I therefore call these grooves the "in-gear notches." The printing-wheels S S' S$^2$ S$^3$ all receive their motion from the first wheel R in the following manner: $h$ is a spring upon the side of the wheel R, which on arriving opposite to the cam T upon the gate F, Figs. 3, 15, 16, and 17, is pressed in, as seen in Fig. 18, and thus as the wheel R is again revolved by the rise of the gate F, as before explained, the spring strikes against one of the arms $x$ of the wheel S, by which means this wheel is carried a short distance with the first one. This distance is governed by the length of the straight face $n$ of the cam, Fig. 17. The spring $h$, having passed this portion of the cam, flies out and disengages itself from the next wheel, which then remains stationary until the first wheel R has completed another revolution, when its spring, being again forced in by the cam T, strikes against another arm $x$ of the second wheel and turns it a sufficient distance to bring the next figure in order over the printing-bed. The wheel S thus continues to move a single notch each time the first wheel R completes a revolution, until when the former has made an entire revolution the spring $k$, Figs. 7 and 8, (which is similar in form and operation to the one $h$ already described,) is brought opposite to the spring $h$ upon the first wheel R. When the parts are in this position, Fig. 19, as the first spring is forced in by the cam T it bears against the spring $k$ and presses it in toward the third wheel S', and thus when the wheel R is again moved the wheels S and S' are both carried with it. The latter S' now remains stationary until S has made one and R ten complete revolutions, when it (S') is moved another notch, and when this latter wheel has been moved ten notches and has completed one revolution the springs upon R S S' are brought in a line, and the next time the shaft G is moved by the pawl M as the gate F rises, the fourth wheel $S^2$ is carried forward one notch, and thus with any number of wheels, each one making a complete revolution before that which succeeds it moves a single notch. It thus appears that the number of changes that may be made upon the machine is only limited by the number of wheels employed.

The machine represented in the accompanying drawings has five printing-wheels, and will print in succession from 1 to 99,999. If another wheel be added, the capability of the machine will be extended to within one of a million.

For ordinary book-paging operations four wheels will be sufficient. For numbering bank-notes a greater number may be employed, if required.

It has already been stated that the wheel R is attached to the shaft G and moves with it, and that each of the wheels S S' $S^2$ $S^3$ has a spring-bolt, which catches in one of the grooves $f$, by which means all frivolous motion of the rings is prevented. These spring-bolts $d$, Fig. 7, are wedge-pointed to correspond with the shape of the grooves $f$. When a sufficient force is applied to the wheels, the bolts are forced back and rest against the surface of the drum until they are brought over another groove, into which they are forced by their springs.

To prevent the shaft G from revolving and to hold it rigidly in position while the gate descends to give the impression, I make use of the following device: U, Figs. 3 and 5, is a disk or wheel attached to the shaft G and having a number of notches in its periphery equal to the number of arms $x$ of the printing-wheels. Into these notches fits a spring-catch W, Figs. 1, 2, 3, 15, and 16, which retains the shaft and first wheel R immovable until sufficient force is again applied to revolve them.

For some varieties of book-paging and for numbering bank-notes it is necessary that the numbers be brought in succession into operation, 1, 2, 3, 4, 5, 6, &c. In such case the short pawl Z, Fig. 11, is employed, which engages every tooth of the ratchet-wheel L and brings the figures consecutively into operation.

For most book-paging operations it is necessary to employ only every other number, as 1, 3, 5, 7, and afterward for the opposite pages 2, 4, 6, 8, &c. For this purpose it only becomes necessary to revolve the ratchet-wheel L two notches instead of one each time the gate F ascends, and to effect this I make use of a long pawl M, Figs. 2, 3, and 12, by which means the printing-wheels are moved two notches each time the gate ascends, and every alternate figure is brought into operation, as desired.

It often happens, particularly in the numbering of railroad-tickets, that it is necessary to repeat the same number a given number of times before the wheels are changed to give the next number in order. To accomplish this I employ what I call a "repeating wheel," which is allowed to revolve with slight friction upon the shaft G, outside the ratchet-wheel L, as seen at L' in Fig. 1. This wheel is represented detached in Fig. 10, and is employed with a broad-footed pawl X, which engages with both of the ratchet-wheels L and L'. The latter is furnished with whole and half notches $t$ and $r$, the whole notches $t$ being of sufficient depth to permit the pawl to enter the notches of the ratchet-wheel L and turn the shaft. When, however, the pawl falls into one of the half-notches $r$ of the wheel L' it is held off from the ratchet-wheel L, and when the gate rises the repeating-wheel is carried around upon the shaft without turning it, and the numbering-wheels remain unchanged. Two impressions are thus made with the same figures.

In Fig. 6 is represented a modification of the repeating-wheel, having but one full notch and nine half-notches, by the use of which ten impressions may be taken from the same types before the wheels are again changed. This device may be used to great advantage when the machine is employed to print railroad-tickets, in which case it is often desirable to repeat the same number upon several tickets to be used on different portions of the same route. In such case the date may also be imprinted upon the check, suitable types Y for the purpose being inserted each day in a holder V, attached to the carrying-rings P.

In Fig. 3 the wheels R and S are in gear and the machine is printing numbers of two figures, the wheels S' $S^2$ $S^3$ being out of gear.

For the purpose of inking the types previous to each impression I make use of the following device: B' is an arm pivoted to the frame-work at $a'$ and connected with the operating-lever by the link C'. The arm B' carries an inking-roll D' and a distributing roll E', which roll down the curved ink-bed F' as the handle H is raised, the inking-roll F' passing beneath and in contact with the face of the types. The bed F' is curved from the point $a'$ as a center, and is formed of spring sheet metal, or is otherwise forced up by springs to keep it in contact with the rolls.

In order to support the springs $h$ and $k$ laterally and to enable them to revolve the numbering-wheels for the purpose of bringing them into operation without being twisted out of place, the pins $y'$ are inserted into the periphery of the wheels and made to bear directly upon the side of the spring, as seen in Figs. 1, 4, and 7.

Operation: The wheel R is turned until the character "0" is directly over the printing-bed G', all the other wheels being out of gear and in such a position that when any one of them is caused to advance one-twentieth of a revolution its figure 1 shall be brought over the printing-bed. When they are in this position, their spring-bolts $d$ all rest in the out-of-gear notch $g$. The handle H is then raised and the wheel R is caused by the pawl Z to make one-tenth of a revolution. The type 1 is thus brought over the bed and is at the same time inked. The leaf, ticket, or other article to be numbered is then placed upon the bed G', the handle is depressed, and the impression is made. As the handle is raised the wheel R is again caused to make one-tenth of a revolution, and by another depression of the handle the impression is made with the type 2, as before. This operation is repeated until the numbers 1 to 9 have been printed. By the last ascent of the handle the spring $h$ upon the first wheel R was brought in contact with the cam T, by which it was forced in, as represented in Fig. 18, so as to bear against the arm $x$ of the wheel S, and as the first wheel is now revolved it carries with it the wheel S, and the figures 10 are brought over the printing-bed, the spring $h$ being released by the cam T the instant the second wheel arrives at the required position, by which means the latter is allowed to remain stationary while the first wheel revolves, it being held in place, as before explained, by its spring-bolt $d$, which now rests in one of the in-gear notches $f$. The wheel S then remains stationary until the first wheel has completed another revolution and the numbers 10 to 19 have been printed. At this juncture the spring $h$ is again thrown by the cam T into the position represented in Fig. 18, and the second wheel is moved another notch and the figures "20" are printed. The second wheel thus continues to move one notch each time the first one makes an entire revolution until the number "99" is printed. At this instant the springs $k$ and $h$ are in line with each other, and the latter, as it is forced in by the cam T to move the wheel S, also presses the spring $k$ into the position represented in Fig. 19, and thus when the first wheel is again moved it carries with it the second and third and the number "100" is printed. The first wheel then continues to revolve, carrying with it at intervals the other two, until "999" is printed, when the fourth wheel is brought into gear by means of a spring upon the third, and the operation continues, any desired number of wheels being employed.

What I claim as my invention, and desire to secure by Letters Patent, is—

1. Operating the numbering-wheels by means of the springs $h$ and $k$ or their equivalents, whereby the first wheel is caused to actuate all the others and the operation of the machine is rendered automatic, in the manner substantially as herein set forth.

2. The repeating-wheel operating according to the form and frequency of the notches thereon, substantially as described.

3. The drum N, with its notches $f$ and $g$, in combination with the numbering-wheels, constructed and operating in the manner substantially as herein set forth.

4. The gate F, in combination with the numbering-wheels and the parts which set them in motion, operating in the manner and for the purpose substantially as described.

WM. C. DEMAIN.

Witnesses:
SAM. COOPER,
JOHN S. CLOW.